United States Patent [19]

Allen et al.

[11] 4,425,464

[45] Jan. 10, 1984

[54] NEUTRALIZING POLYETHYLENE CATALYST RESIDUES

[75] Inventors: James A. Allen, Lake Jackson; Randall S. Shipley, Alvin, both of Tex.

[73] Assignee: The Dow Chemical Company, Midland, Mich.

[21] Appl. No.: 380,180

[22] Filed: May 20, 1982

[51] Int. Cl.$^3$ .......................... C08F 6/02; C08K 5/09
[52] U.S. Cl. ................................ 524/400; 264/328.17; 524/310; 524/317; 524/394; 524/397; 524/399; 526/125; 526/348; 526/348.2; 528/485; 528/486
[58] Field of Search ................ 528/485, 486; 524/310, 524/317, 397, 399, 400, 394

[56] References Cited

U.S. PATENT DOCUMENTS 4,105,609  8/1978  Machon et al. .................. 260/23 H

OTHER PUBLICATIONS

J. E. Kresta, Interactions Between Remnants of Ziegler–Natta Catalysts, Polyolefins and Stabilizers During Processing, 38th Annual Technical Conference, Society of Plastics Engineers, May 1980, pp. 478–480.

*Primary Examiner*—Stanford M. Levin
*Attorney, Agent, or Firm*—James G. Carter

[57] ABSTRACT

Transition metal-derived coordination catalyst residues are neutralized by contacting with a pseudo-polyester material such as calcium stearoyl lactylate, which is comprised of a metal salt of a condensation reaction product of a fatty acid and a hydroxyl-containing acid.

32 Claims, No Drawings

NEUTRALIZING POLYETHYLENE CATALYST RESIDUES

BACKGROUND OF THE INVENTION

The present invention concerns the neutralization of coordination catalyst residues, particularly residues of Ziegler-type catalysts useful in olefin polymerization processes.

It is well known that the residues of support based coordination catalysts, especially Ziegler-Natta catalysts, in stabilized polymers leads to a decrease in the thermooxidative stability of the polymers. This effect is associated with reactions occurring between the catalyst residues and additives in the polymer during high temperature processing and generally lead to increased discoloration of the polymer. It is difficult to characterize these reactive residues because their composition depends not only on the conditions under which the polymerization was carried out but also upon any subsequent processes in which the polymer has come into contact with oxygen and moisture.

It is important to note that there is an important distinction between additives which deactivate a coordination catalyst and additives which neutralize the catalyst residues. Deactivation of these catalysts is necessary to eliminate post polymerization reactions in process equipment and may be accomplished using any of the typical catalyst "poisons" known; i.e., $O_2$, $H_2O$, alcohol, etc. However, in many cases, the deactivated catalyst residues are in themselves highly reactive at elevated temperatures in the presence of oxygen or moisture. This may lead to limited corrosion of metal processing equipment in a manner similar to that observed in a non-treated, non-deactivated polymer.

Neutralization of the catalyst residues typically also involves deactivation of the catalyst. In addition, however, these neutralizing compounds complex with the catalyst residues in a manner so as to render them inactive, or non-corrosive, during subsequent processing.

Transition metal-derived polyethylene catalysts have been deactivated and neutralized by contact with salts of carboxylic acids as disclosed in U.S. Pat. No. 4,105,609. While the metal salts disclosed in this patent are suitable for neutralizing Ziegler catalyst residues employed in polymerizing polymers prepared with Ziegler catalyst and preventing, to some degree, corrosion in metal processing equipment, they suffer from at least two serious disadvantages: (1) they are fairly insoluble in most commonly employed solvents, making addition to the polymer difficult at best, and (2) they tend to plate out on the surfaces of molding or casting equipment, causing an undesirable build-up of the metal salt on the equipment and necessitating production shutdowns to clean the equipment.

The problem of equipement plate-out or build-up, such as observed on mold plates of injection molding equipment or on the chill roll of a cast film unit, associated with the carboxylic acid metal salts mentioned above is reduced or eliminated by employing the "pseudo-polyester" neutralization agents of the present invention. Also, the initial color of the polymers containing Ziegler catalyst residues which have subsequently been neutralized according to the present invention are at least equivalent to examples using previous teachings in that they are more white and less yellow than samples containing no such neutralization agent. In addition, in many cases these "pseudo-polyesters" may function as a processing aid during extrusion of the neutralized material.

SUMMARY OF THE INVENTION

The present invention pertains to an improvement in a process for neutralizing transition metal-based catalysts wherein a polymer containing such catalysts is contacted with a neutralizing quantity of a catalyst neutralizing agent and wherein the improvement comprises employing as said catalyst neutralizing agent a pseudo-polyester material resulting from (A) reacting at a temperature of from about 0° C. up to the decomposition temperature of the reaction product, preferably from about 10° C. to about 200° C., most preferably from about 25° C. to about 150° C., a composition comprising
  (1) at least one hydroxyl-containing saturated or unsaturated mono- or polycarboxylic acid having from about 3 to about 20, preferably from about 3 to about 10, and most preferably from about 3 to about 8, carbon atoms per molecule; and
  (2) at least one saturated or unsaturated mono- or polycarboxylic acid free of hydroxyl-groups and having from about 6 to about 30, preferably from about 6 to about 25, and most preferably from about 6 to about 20, carbon atoms per molecule; wherein components (A-1) and (A-2) are present in quantities which provide a molar ratio of (A-2):(A-1) of from 0:1 to about 10:1, preferably from about 0.1:1 to about 5:1 and most preferably from about 0.2:1 to about 2:1; and subsequently
(B) reacting any acid groups of the condensation product with a salt or mixture of salts of a metal from Groups IA, IIA or IIB of the Periodic Table or with a suitable Lewis type base such as an amine or alkanolamine.

Another aspect of the present invention also pertains to an improvement in a process for neutralizing Ziegler catalysts wherein a polymer containing such catalysts is contacted with a quantity of a neutralizing agent and wherein the improvement comprises employing as said neutralizing agent at least one compound represented by the pseudo-polyester structure

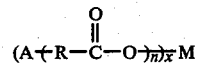

wherein each R is independently a hydrocarbyl group having from about 1 to about 20, preferably from about 1 to about 10, and most preferably from about 1 to about 8 carbon atoms; each A is independently a hydroxyl group or a group represented by the formula

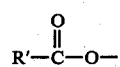

wherein each R' is independently a hydrocarbyl group having from about 5 to about 29, preferably from about 5 to about 24, and most preferably from about 5 to about 19 carbon atoms; M is a metal from Groups IA, IIA or IIB of the Periodic Table; n has a value from 1 to about 10; and x has a value corresponding to the valence of the metal M. In addition, M may be replaced by an amine or alkanolamine group. Such compositions are taught in U.S. Pat. No. 2,733,252, assigned to the C. J. Patterson Company.

The term hydrocarbyl as employed herein means that the groups contain only carbon and hydrogen atoms and can be either saturated or unsaturated aliphatic groups.

The present invention also pertains to polymers which have been prepared by polymerizing one or more polymerizable α-olefins or a mixture of one or more polymerizable α-olefins and at least one polymerizable ethylenically unsaturated monomer in the presence of a supported or unsupported transition metal-containing catalyst and wherein said residues of the catalyst have been neutralized by contacting said polymer containing said catalyst residues with a neutralizing quantity of a pseudo-polyester catalyst neutralizing agent which is a product resulting from (A) reacting at a temperature of from about 0° C. up to the decomposition temperature of the reaction product, preferably from about 10° C. to about 200° C., most preferably from about 25° C. to about 150° C., a composition comprising (1) at least one hydroxyl-containing saturated or unsaturated mono- or polycarboxylic acid having from about 3 to about 20, preferably from about 3 to about 10, and most preferably from about 3 to about 8, carbon atoms per molecule, and (2) at least one saturated or unsaturated mono- or polycarboxylic acid free of hydroxyl-groups and having from about 6 to about 30, preferably from about 6 to about 25, and most preferably from about 6 to about 20, carbon atoms per molecule; wherein components (A-1) and (A-2) are present in quantities which provide a molar ratio of (A-2):(A-1) of from 0:1 to about 10:1, preferably from about 0.1:1 to about 5:1, and most preferably from about 0.2:1 to about 2:1; and subsequently (B) reacting any acid groups of the condensation product with a salt or mixture of salts of a metal from Groups IA, IIA or IIB of the Periodic Table, or with a suitable Lewis type base such as amine or alkanolamine.

DETAILED DESCRIPTION OF THE INVENTION

Suitable hydroxyl-containing acids which can be employed herein include those saturated or unsaturated aliphatic carboxylic acids having at least one hydroxyl group and at least one carboxyl group and which has from about 3 to about 20, preferably from about 3 to about 10, and most preferably from about 3 to about 8, carbon atoms. Particularly suitable hydroxyl-containing acids include, for example, lactic acid, glyceric acid, malic acid, tartaric acid, mixtures thereof and the like.

Suitable mono- or polycarboxylic acids free of hydroxyl groups other than those associated with the carboxyl groups of the acid functionality which can be employed herein include those saturated or unsaturated aliphatic carboxylic acids having from about 6 to about 30, preferably from about 6 to about 25, and most preferably from about 6 to about 20, carbon atoms. Particularly suitable acids include, for example, stearic acid, capric acid, caproic acid, mixtures thereof and the like.

Suitable neutralizing compounds include those represented by the formula

$M_a Q_b$ wherein M is a metal from groups IA, IIA, or IIB of the Periodic Table and Q is an anion selected from the group consisting of —OH, —O, —CO$_3$ or —HCO$_3$; a has a value corresponding to the valence of Q times b divided by the valence of M. Particularly suitable neutralizing salts include, for example, sodium hydroxide, potassium hydroxide, calcium hydroxide, calcium oxide, magnesium oxide, calcium carbonate, sodium bicarbonate, mixtures thereof and the like. In lieu of a metal salt, a suitable Lewis base, such as an amine or an alkanolamine, may be employed.

The neutralization of the catalyst can be conducted prior to removing the polymer from a polymerization reactor or, preferably, after removing the polymer from any such reactor. The deactivation agent can be employed alone in a molten state by adding the molten agent to the polymer/catalyst mixture at the desired place or the agent can be dissolved into or slurried with any suitable inert solvent or medium, particularly aliphatic hydrocarbons or mixtures thereof, and then added to such polymer/catalyst mixtures at the desired place. It is most desirable to add the deactivating agents of this invention in the molten neat state or at least highly concentrated, >25% in a solvent such that excess solvent normally present with calcium stearate slurries (10% by weight or less) is not added to the polymer. This excess solvent must be removed through devolatilization or drying of the material, thereby increasing energy costs associated with the overall process. In addition, the low melting point allows excellent mixing of the deactivator with the polymer without being so volatile, due to the size and presence of the R' groups, as to be recycled throughout the process along with the solvent removed during solvent removal.

Also, since such polymers may, typically, also be treated with ultraviolet stabilizer compounds such as, for example, 2-hydroxy-4-octoxybenzophenone (UV-531), 3,4-di-tert-butyl phenyl-3,5-di-tert-butyl-4-hydroxybenzoate (UV-2300), [2,2'-thiobis(4-t-octylphenolato)]-n-butylamine nickel II (UV-1084), all available from American Cyanamid, bis(2,2',6,6'-tetramethylpiperidinyl-4-sebacate (TINUVIN 770) available from Ciba Geigy, or zinc oxide, and/or antioxidants such as aromatic hydroxyl-containing materials, these compounds can be blended with the catalyst neutralizing agent and added simultaneously therewith to the polymer/catalyst mixture, thereby eliminating a separate addition step or the addition of additional quantities of solvent carrier which must be removed from the polymer prior to sale of the material. In addition, the melting point of these pseudo-polyesters is low enough so as to not decompose these stabilizing additives.

While the neutralizing agents of the present invention can be employed to neutralize essentially any supported or unsupported transition metal-containing catalyst, such as those described in U.S. Pat. No. 2,846,429, 4,182,815 or 4,243,552, all assigned to Phillips Petroleum, or U.S. Pat. No. 4,086,408 or U.S. Pat. No. 4,115,649, both assigned to Union Carbide, it is particularly suitable for those catalysts containing transition metals of Groups IVB and VB. Particularly suitable transition metal catalysts which may be deactivated by the compounds of this invention include those disclosed by Lowery et al. in U.S. Pat. No. 4,250,288; May et al. in U.S. Pat. No. 4,104,198; Gessell et al. in U.S. Pat. No. 4,091,082, U.S. Pat. No. 4,167,615; and U.S. Pat. No. 4,067,822; Birkelbach in U.S. Pat. No. 4,120,820 and U.S. Pat. No. 4,189,553; Gibbs in U.S. Pat. No.

4,283,515 and U.S. Pat. No. 4,295,992; Birkelbach et al. in U.S. Pat. No. 4,198,315 and U.S. Pat. No. 4,243,785; Shipley et al. in U.S. Pat. No. 4,238,355 and U.S. Pat. No. 4,308,369; Lowery et al. in U.S. Pat. No. 4,224,186; Gessell in U.S. Pat. No. 4,244,838; Shipley in U.S. Pat. No. 4,250,286 and U.S. Pat. No. 4,269,733; Bressler et al. in U.S. Pat. No. 4,204,050; Lowery et al. in U.S. Pat. No. 4,269,422 and U.S. Pat. No. 4,285,834; and Shipley et al. in U.S. Pat. No. 4,310,648 all of which are incorporated herein by reference.

The polymerization can be conducted by any of the well known processes such as, for example, slurry, solution, gas phase and the like. Temperatures of from about 50° to about 300° C. can be suitably employed, depending upon the particular process employed. Also, pressures of from atmospheric (100 kPa) to about 2100 atmospheres (209.8 MPa) can be utilized, also depending upon the particular process and the capabilities of the equipment employed.

Suitable monomers which can be employed herein include α-olefins having from 2 to about 10 carbon atoms or mixturs of such α-olefins or mixtures of one or more such α-olefins with one or more polymerizable ethylenically unsaturated monomers.

The following examples are illustrative of the present invention, but are not to be construed as to limiting the scope thereof in any manner.

The catalyst neutralizer employed was calcium stearoyl lactylate commercially available from C. J. Patterson Company (also known as Patco) as VERV, powder or flake. A similar product also available, EMPLEX, which is the sodium salt of the pseudo-polyester reaction product.

EXAMPLE 1

LAB-SCALE POLYMER STUDY

A. Catalyst Preparation

The following catalyst was prepared in a nitrogen-filled dry box using a 4-oz (118.3 ml) narrow mouth catalyst bottle

| | |
|---|---|
| 82.0 ml of | Isopar ® E |
| 8.0 ml of | 0.15 M MgCl$_2$ (prepared by the reaction of n-butyl-sec-butyl magnesium with anhydrous HCl) |
| 2.0 ml of | 0.15 M diethylaluminum chloride |
| 6.0 ml of | 0.015 M titanium tetra-isopropoxide |
| 2.0 ml of | 0.15 M triethylaluminum |
| 100.0 ml | |

Overall atomic ratios of Mg/Cl/Ti/Al are 40/90/3/20.

B. Polymerization Run

Ethylene polymerization runs were conducted in a 1-gallon (3.8-l) stirred autoclave heated to 180° C. Two liters of Isopar ®E are added to the reactor and heated to temperature, then vented to eliminate any nitrogen which was dissolved in the solvent during storage. Solvent vapor pressure was 70 psig (482.6 kPa). To this was added 5 psig (34.5 kPa) of hydrogen as a molecular weight regulator and 375 psig (2585.6 kPa) of ethylene for a total reactor pressure of 450 psig (3102.7 kPa). Then 20 milliliters of the above described catalyst (0.009 mmole Ti) were injected into the reactor. An immediate reaction proceeded as evidenced by the reactor exotherm and ethylene consumption. Additional ethylene was added to replace that consumed by use of a demand regulator and actual ethylene consumed was monitored by use of an in-line flow meter. After 15 minutes (900 s), ethylene flow was stopped. Catalyst efficiencies observed were ~0.1×10$^6$ g PE/g Ti.

C. Catalyst Neutralization

Upon completion of the polymerization, total polymer produced was calculated based on flow meter readings. Using this information, it was determined how much antioxidant (Irganox ®1010) and catalyst neutralizer/halogen scavenger (calcium stearate or calcium stearoyl lactylate) should be added to give antioxidant levels of 500 ppm and neutralizer levels of 1000 ppm. These amounts were added to a 5-liter resin kettle which was modified with air-driven stirrer blades in the bottom. The hot polymer was then emptied into the resin kettle. While still molten, the stirrer blades mixed the polymer with the antioxidant and neutralizer/scavenger. Samples were then air dried for 24 hours (86400 s) to remove gross amounts of solvent prior to being dried in a nitrogen-purged vacuum oven at 90° C. for 12 hours (43200 s).

D. Color Determination

After drying, samples were molded into 2½ inch (6.35 cm) diameter, ¼ inch (0.635 cm) thick circular coupons for color testing. Color whiteness and yellowness were measured on a Gardner Instruments Model XL-23 Colorimeter at 0° reflectance. Both sides of the coupons were measured and the results averaged. Four duplicate readings were made, then averaged to determine initial sample color. Results are shown in Table I. In these color determinations, color may result from catalyst residues which have not been properly neutralized by the halogen scavenger. Typically, lower whiteness and higher yellowness numbers indicate lower catalyst residue neutralization. As can be seen in Table I, both the calcium stearate and the calcium stearoyl lactylate give lower yellowness and improved whiteness over a blank coupon containing no additives. However, at these very low catalyst efficiencies, equivalent to approximately 10 ppm Ti residue in the polymer, it is evident that calcium stearoyl lactylate imparts improved color to the polymer compared to calcium stearate. This improvement may be due to a combination of reasons: the pseudo-polyester structure, lower melting point, or improved mixability of the calcium stearoyl lactylate, for example.

TABLE I

| | Blank | Calcium Stearate | Calcium Stearoyl Lactylate |
|---|---|---|---|
| Whiteness[1] | 35.51 | 41.25 | 52.86 |
| Yellowness[1] | 14.72 | 12.81 | 8.98 |
| Whiteness[2] | 43.67 | 41.96 | 53.92 |
| Yellowness[2] | 12.02 | 12.70 | 8.78 |
| Whiteness[3] | 44.90 | 42.36 | 54.39 |
| Yellowness[3] | 11.79 | 12.43 | 8.56 |

[1]Average of color readings immediately after molding sample coupons.
[2]Average color readings after room temperature aging 96 hours (345,600 s) after molding sample coupons.
[3]Average of color readings after room temperature aging 264 hours (950,400 s) after molding sample coupons.

Additional room temperature aging of the sample coupons gives additional proof of the importance of this invention. After 96 hours (345,600 s) see Table I), the color of the blank has improved significantly (possibly due to air oxidation of some of the catalyst residue chromophores), leading to a color equivalent to the calcium stearate containing sample. The calcium stearoyl lactylate, however, still shows a much superior color. Aging an additional 168 hours (604,800 s) (264 hours or 950,400 s total) shows little change in these numbers.

EXAMPLE 2
PILOT PLANT POLYMER STUDY

A. Sample Preparation

Approximately 200 lbs. (90.72 kg) of catalyst were prepared in Isopar®E having a molar ratio of Ti:Al:Mg:CL of 3:12:40:86 and a Ti concentration of 0.000132 pbw Ti/pbw catalyst. This was fed to a 40-gallon (151.4-1) stirred autoclave reactor along with an additional 4.75 parts of aluminum triethyl per part of Ti. Also fed to the reactor was additional solvent and ethylene at 500 psig (3447.4 kPa) as well as octene-1 as a comonomer. The reactor temperature was kept constant at 200° C. using the heat of the polymerization reaction. Polymer was produced having a melt index ($I_2$) of 2 to 5 and a density of approximately 0.930. Upon exiting the reactor, the following catalyst neutralization systems were added 1. Irganox®1010 (250 ppm)
2. Calcium stearoyl lactylate (1000 ppm)
3. Calcium stearate (1000 ppm)+Irgonox®1010 (250 ppm)
4. Calcium stearoyl lactylate (1000 ppm)+Irgonox®1010 (250 ppm)

In addition, a blank (no additives) was prepared.

B. Color Determination

Color numbers were obtained on all of theses samples in a manner similar to that described in Example 1. These analyses are shown in Table II for 4 samples of each system sampled at different times during the preparation.

TABLE II

| Sample Number | Blank | Calcium Stearate + Irganox 1010 | Irganox 1010 | Calcium Stearoyl Lactylate | Calcium Stearoyl Lactylate Irganox 1010 |
|---|---|---|---|---|---|
| YELLOWNESS | | | | | |
| 1 | 5.59 | 2.00 | 3.30 | 2.08 | 2.02 |
|   | 5.48 | 1.98 | 3.11 | 2.09 | 2.14 |
| 2 | 5.53 | 1.57 | 3.24 | 1.91 | 2.03 |
|   | 5.37 | 1.79 | 2.96 | 1.92 | 2.05 |
| 3 | 4.69 | 1.74 | 3.23 | 1.97 | 2.12 |
|   | 4.40 | 1.60 | 3.07 | 1.92 | 2.18 |
| 4 | 4.80 | 1.46 | 3.37 | 1.91 | 2.07 |
|   | 4.72 | 1.57 | 3.16 | 1.92 | 2.13 |
| Average | 5.07 | 1.71 | 3.18 | 1.88 | 2.09 |
| WHITENESS | | | | | |
| 1 | 61.14 | 71.24 | 67.78 | 71.66 | 71.10 |
|   | 61.54 | 72.14 | 67.97 | 71.22 | 71.04 |
| 2 | 61.39 | 72.20 | 67.40 | 72.00 | 71.04 |
|   | 61.75 | 71.95 | 67.80 | 71.92 | 71.04 |
| 3 | 63.31 | 71.84 | 67.44 | 71.95 | 71.22 |
|   | 63.87 | 72.03 | 67.72 | 71.97 | 71.53 |
| 4 | 63.27 | 72.73 | 66.81 | 71.91 | 71.48 |
|   | 63.73 | 72.62 | 67.34 | 71.80 | 71.60 |
| Average | 62.50 | 72.09 | 67.53 | 71.78 | 71.26 |

It is apparent from these results that, under a scaled-up evaluation, both calcium stearate and calcium stearoyl lactylate give improved whiteness and decreased yellowness in the polymer as compared to a "blank" or Irganox®1010 alone. Once again, however, the calcium stearoyl lactylate was superior in that it was hydrocarbon soluble and could be more easily pumped into the system than the slurried calcium stearate.

Another indication of how well the catalyst residues have been neutralized may be found in the oxygen stability of the polymer. It this case, the sample is heated to 350° F. in air and its weight is monitored to observe the onset of oxidation. Materials in which the metal has been more completely neutralized will show longer induction times to oxidation. This is once again observed in Table III where, with no antioxidant present, the calcium stearoyl lactylate gave better oxygen stability than did the calcium stearate.

TABLE III

| Sample | Induction Period, minutes/seconds |
|---|---|
| Blank | 3.0/180 |
| Calcium Stearate | 3.5/210 |
| Calcium Stearoyl Lactylate | 5.0/300 |

C. Molded Articles

When using an injection molder or cast film equipment, improperly neutralized polymer rapidly manifests itself on the equipment. Polymer which has not been totally neutralized may still have corrosive residues present which can pit and/or stain the surfaces of the equipment. Polymers in which the residues have been neutralized may still show a phenomenon known as plate-out due to build-up of the neutralizing material on the equipment. An ideal neutralizing agent would be one which eliminates corrosive residues, but does not exhibit significant amounts of plate-out on the fabrication equipment. Corrosion tests were run on the plant-produced material using a Husky T1375PH injection molder. A mold with removable mild-steel plates was used. Each test lasted approximately six hours (21600 s), and the plates were then tested for (a) staining, (b) plate-out, and (c) pitting. Operating conditions were as follows:

| Extruder Rear, °F./°C. | 322/161.1 |
|---|---|
| Extruder Center, °F./°C. | 340/171.1 |
| Extruder Front, °F./°C. | 340/171.1 |
| Shooting Pot, °F./°C. | 375/190.6 |
| Spare, °F./°C. | 350/176.7 |
| Nozzle | 90% |
| Mold Open | 1 sec. |
| Mold Close | 30 sec. |
| Injection Forward | 1 sec. |

After the tests were completed, the plates were microscopically examined and described. The sample containing no neutralizing agent (blank) showed some microscopic pitting with severe staining. The sample containing calcium stearate showed moderate staining and plated-out in concentric circles around the sprue. The calcium stearoyl lactylate showed no staining and extremely low levels of plate-out, less than 2% of the area of the plate.

We claim:

1. In a process for neutralizing transition metal-containing catalyst residues wherein a polymer containing such catalyst residues is contacted with a quantity of a neutralizing agent; the improvement which comprises employing as said catalyst neutralizing agent the product resulting from (A) reacting at a temperature of from about 0° C. up to the decomposition temperature of the reaction product, a composition comprising (1) at least one saturated or unsaturated hydroxyl-containing mono- or polycarboxylic acid having from about 3 to about 20 carbon atoms per molecule; and (2) at least one saturated or unsaturated mono- or polycarboxylic acid free of hydroxyl-groups and having from about 6 to about 30 carbon atoms per molecule; wherein components (A-1) and (A-2) are present in quantities which provides a molar ratio of (A-2):(A-1) of from about 0:1 to about 10:1, and subsequently (B) reacting acid groups of the reaction product with a neutralizing compound or mixture of such compounds containing at least one metal from Groups IA, IIA or IIB of the Periodic Table.

2. A process of claim 1 wherein
(a) component (A-1) is a hydroxyl-containing, saturated, aliphatic monocarboxylic acid having from about 3 to about 10 carbon atoms;
(b) component (A-2) is a saturated, aliphatic, monocarboxylic acid having from about 6 to about 25 carbon atoms,
(c) the molar ratio of components (A-2):(A-1) is from about 0.1:1 to about 5:1;
(d) said neutralizing compound is a salt of sodium, potassium, calcium or magnesium.

3. A process of claim 2 wherein
(a) component (A-1) has from about 3 to about 8 carbon atoms;
(b) component (A-2) has from about 6 to about 20 carbon atoms; and
(c) the molar ratio of component (A-2):(A-1) is from about 0.2:1 to about 2:1.

4. A process of claim 3 wherein
(a) component (A-1) is at least one of lactic acid, glyceric acid, malic acid or tartaric acid;
(b) component (A-2) is at least one of stearic acid, capric acid or caproic acid; and
(c) said neutralizing compound is at least one of sodium hydroxide, calcium hydroxide, calcium oxide, magnesium oxide, calcium carbonate, and sodium bicarbonate.

5. In a process for neutralizing Ziegler catalyst residues wherein a polymer containing such catalysts is contacted with a neutralizing quantity of a neutralizing agent; the improvement which comprises employing as said neutralizing agent, at least one compound represented by the formula

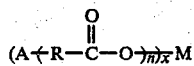

wherein each R is independently a hydrocarbyl group having from about 1 to about 20 carbon atoms; A is independently a hydroxyl group or a group represented by the formula

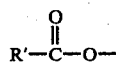

wherein each R' is independently a hydrocarbyl group having from about 5 to about 29 carbon atoms; M is a metal from Groups IA, IIA or IIB of the Periodic Table or a Lewis base; n has a value from 1 to about 10; and x has a value corresponding to the valence of said metal M or Lewis base.

6. A process of claim 5 wherein
(a) A is represented by the formula

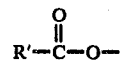

wherein R' is a saturated aliphatic group having from about 5 to about 24 carbon atoms;
(b) R is a saturated aliphatic group having from about 1 to about 10 carbon atoms,
(c) M is calcium, sodium, potassium or magnesium.

7. A process of claim 6 wherein
(a) R' has from 5 to about 19 carbon atoms
(b) R has from about 1 to about 8 carbon atoms; and
(c) M is calcium.

8. A process of claim 5 wherein
(a) A is represented by the formula

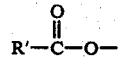

wherein R' is a saturated aliphatic group having from about 5 to about 29 carbon atoms;
(b) R is a saturated aliphatic group having from about 1 to about 20 carbon atoms,
(c) M is an amine or an alkanolamine.

9. A process of claim 6 wherein
(a) R' has from 5 to about 24 carbon atoms
(b) R has from about 1 to about 10 carbon atoms; and
(c) M is triethylamine or triethanolamine.

10. A polymer which has been prepared by polymerizing one or more polymerizable α-olefins or a mixture of one or more polymerizable α-olefins with at least one polymerizable ethylenically unsaturated monomer in the presence of a supported or unsupported transition metal-containing catalyst and which polymer contains residues of said catalyst and wherein said residues of said catalyst have been neutralized by contacting said catalyst with a quantity of a catalyst neutralizing agent which is a product resulting from (A) reacting at a temperature of from about 0° C. up to the decomposition temperature of the reaction product, a composition comprising
(1) at least one saturated or unsaturated hydroxyl-containing mono- or polycarboxylic acid having from about 3 to about 20 carbon atoms per molecule and
(2) at least one saturated or unsaturated mono- or polycarboxylic acid free of hydroxyl-groups and having from about 6 to about 30 carbon atoms per molecule; wherein components (A-1) and (A-2) are present in quantities which provide a molar ratio of (A-2):(A-1) of from about 0:1 to about 10:1; and subsequently (B) reacting acid groups of the reaction product with a neutralizing compound or mixture of such compounds containing at least one metal from Groups IA, IIA or IIB of the Periodic Table.

11. A polymer of claim 10 wherein
(a) component (A-1) is a hydroxyl-containing, saturated, aliphatic monocarboxylic acid having from about 3 to about 10 carbon atoms;
(b) component (A-2) is a saturated, aliphatic, monocarboxylic acid having from about 6 to about 25 carbon atoms,
(c) the molar ratio of components (A-2):(A-1) is from about 0.1:1 to about 5:1;

(d) said neutralizing compound is a salt of sodium, potassium, calcium or magnesium.

12. A polymer of claim 11 wherein
(a) component (A-1) has from about 3 to about 8 carbon atoms;
(b) component (A-2) has from about 6 to about 20 carbon atoms; and
(c) the molar ratio of component (A-2):(A-1) is from about 0.2:1 to about 2:1.

13. A polymer of claim 12 wherein
(a) component (A-1) is at least one of lactic acid, glyceric acid, malic acid or tartaric acid;
(b) component (A-2) is at least one of stearic acid, capric acid or caproic acid; and
(c) said neutralizing compound is at least one of sodium hydroxide, calcium hydroxide, calcium oxide, magnesium oxide, calcium carbonate and sodium bicarbonate.

14. A polymer which has been prepared by polymerizing one or more polymeriable α-olefins or a mixture of one or more polymerizable α-olefins and at least one polymerizable ethylenically unsaturated monomer in the presence of a supported or unsupported transition metal-containing catalyst, said polymer containing residues of said catalyst and wherein said residues of said catalyst have been neutralized by contacting said catalyst with a neutralizing quantity of a catalyst neutralizing agent which is at least one compound represented by the formula

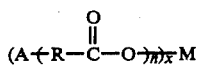

wherein each R is independently a hydrocarbyl group having from about 1 to about 20 carbon atoms, A is independently a hydroxyl group or a group represented by the formula

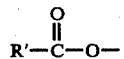

wherein each R' is independently a hydrocarbyl group having from about 5 to about 29 carbon atoms, M is a metal from Groups IA, IIA or IIB of the Periodic Table or a Lewis base; n has a value from 1 to about 10; and x has a value corresponding to the valence of the metal M or Lewis base.

15. A polymer of claim 14 wherein
(a) A is represented by the formula

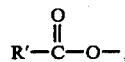

wherein R' is a saturated aliphatic group having from about 5 to about 24 carbon atoms;
(b) R is a saturated aliphatic group having from about 1 to about 10 carbon atoms,
(c) M is calcium, sodium, potassium or magnesium.

16. A polymer of claim 15 wherein
(a) R' has from 5 to about 19 carbon atoms
(b) R has from about 1 to about 8 carbon atoms; and (c) M is calcium.

17. A polymer of claim 14 wherein
(a) A is represented by the formula

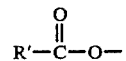

wherein R' is a saturated aliphatic group having from about 5 to about 24 carbon atoms;
(b) R is a saturated aliphatic group having from about 1 to about 10 carbon atoms,
(c) M is an amine or alkanolamine.

18. A polymer of claim 15 wherein
(a) R' has from 5 to about 19 carbon atoms
(b) R has from about 1 to about 8 carbon atoms; and
(c) M is triethylamine or triethanol amine.

19. A process or polymer of claims 1, 2, 3, 4, 5, 6, 7, 8, 9, 10, 11, 12, 13, 14, 15, 16, 17 or 18 wherein said polymer is a polymer of ethylene or a mixture of ethylene and at least one α-olefin having from 3 to about 10 carbon atoms.

20. A process or polymer of claim 19 wherein said polymer is a polymer of ethylene or a mixture of ethylene and at least one of propylene, butene-1, hexene-1, octene-1 or decene-1.

21. A process or polymer of claims 1, 2, 3, 4, 5, 6, 7, 8, 9, 10, 11, 12, 13, 14, 15, 16, 17 or 18 wherein said transition metal catalyst contains atoms of Ti, Mg and Al.

22. A process or polymer of claim 19 wherein said transition metal catalyst contains atoms of Ti, Mg and Al.

23. A process or polymer of claim 20 wherein said transition metal catalyst contains atoms of Ti, Mg and Al.

24. A process or polymer of claims 1, 2, 3, 4, 5, 6, 7, 8, 9, 10, 11, 12, 13, 14, 15, 16, 17 or 18 wherein said transition metal catalyst contains atoms of Cr and Al.

25. A process or polymer of claim 19 wherein said transition metal catalyst contains atoms of Cr and Al.

26. A process or polymer of claim 20 wherein said transition metal catalyst contains atoms of Cr and Al.

27. A process or polymer of claims 1, 2, 3, 4, 5, 6, 7, 8, 9, 10, 11, 12, 13, 14, 15, 16, 17 or 18 wherein said transition metal catalyst contains atoms of V, Mg and Al.

28. A process or polymer of claim 19 wherein said transition metal catalyst contains atoms of V, Mg and Al.

29. A process or polymer of claim 20 wherein said transition metal catalyst contains atoms of V, Mg and Al.

30. A process or polymer of claims 1, 2, 3, 4, 5, 6, 7, 8, 9, 10, 11, 12, 13, 14, 15, 16, 17 or 18 wherein said transition metal catalyst contains atoms of Zr, Mg and Al.

31. A process or polymer of claim 19 wherein said transition metal catalyst contains atoms of Zr, Mg and Al.

32. A process or polymer of claim 20 wherein said transition metal catalyst contains atoms of Zr, Mg and Al.

* * * * *